United States Patent Office 2,749,379
Patented June 5, 1956

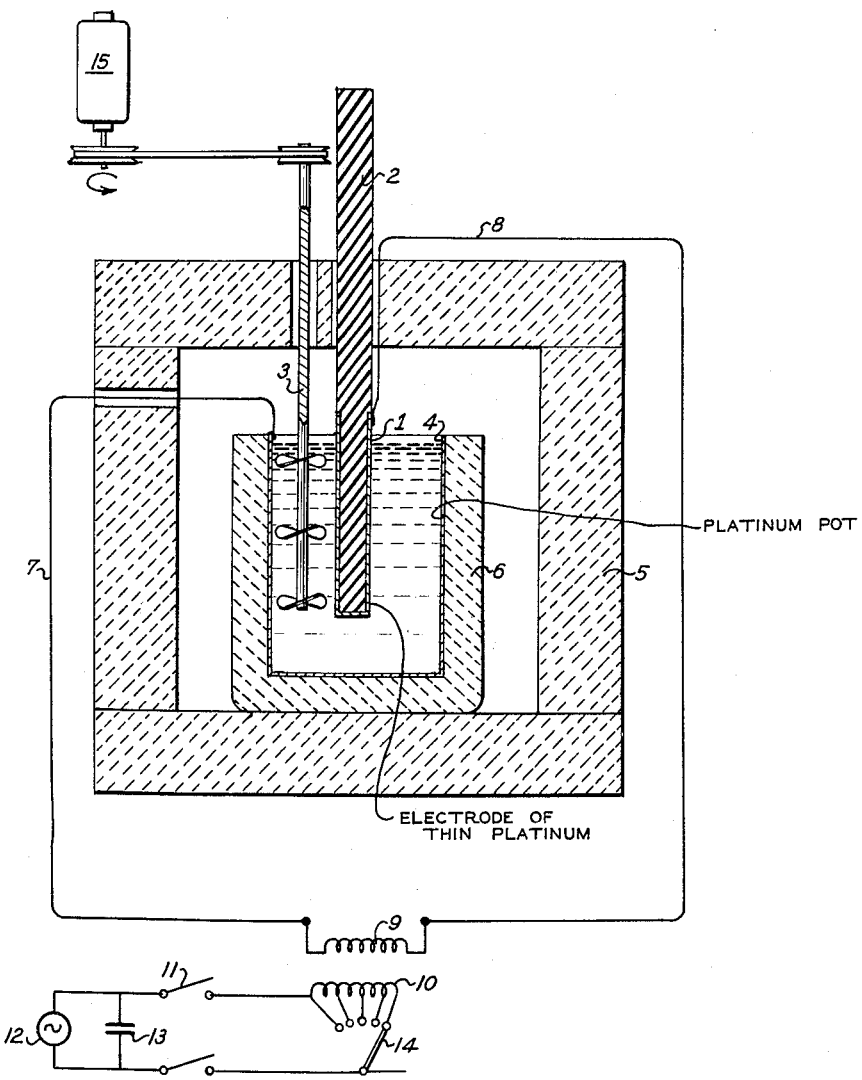

2,749,379

MEANS AND METHOD FOR THE ELECTRIC MELTING OF GLASS

Walter Geffcken, Landshut, and Carsten Eden, Mainz, Germany, assignors to Jenaer Glaswerk Schott & Gen., Mainz, Rheinland-Pfalz, Germany Application June 3, 1953, Serial No. 359,447

Claims priority, application Germany June 6, 1952

12 Claims. (Cl. 13—34)

In the electrical melting of glass by joulean heat, the heater current is usually brought to the melting charge by means of electrodes which dip into the melting charge or in another way secure a good transient. Due to the electrolytic decomposition of the melt which frequently occurs in such cases and which mostly causes a coloration of the glass it is in general, in spite of the use of A. C., not possible to melt a pure and uncolored glass if a heater current of the usual power supply frequency of 50 cycles per second is being used. For this reason it was suggested to increase the frequency of the heater current; but even at the highest known frequency of about 1000 cycles per second attained up to now the aim was not quite reached. The cause for this lies in the fact that actually electrolytic effects are eliminated to a great extent but that in most cases a weak gray coloring will occur owning to a colloidal atomization of the electrodes which starts already between the electrodes and the melting charge at about 3 amps. per square centimeter if the conventional transition current densities are used.

One object of this invention is to overcome the above-mentioned difficulties, and to obtain faultless glass melts. This, and still further objects, will become apparent from the following description, read in conjunction with the drawing, which shows a conventional electrode glass furnace for electrically melting glass by joulean heat.

In accordance with the invention these objects are obtained if a heater current with a frequency of at least 2000 cycles per second is used.

A conventional electrode glass furnace for electrically melting glass by joulean heat such as the one shown in the drawing may be used for effecting the invention. As shown, the furnace has a suitably insulated wall or casing 5 with a protective ceramic pot 6 positioned therein. The ceramic pot 6 has an inner platinum casing 4 to which an electric lead 7 which extends through the casing wall is connected. This platinum casing comprises one of the electrodes of the furnace.

An insulating bracket 2 extends through the furnace wall 5 to within the pot 6 spaced from the walls thereof. The end of the insulating bracket in the pot is surrounded with a thin metal layer 1 to which the electric lead 8 is connected. The metal layer 1 which may, for example, be of platinum, constitutes the other electrodes of the furnace. The leads 7 and 8 are connected to the winding 9 of a transformer. The other winding 10 of the transformer is connected through the switch 11 to a suitable source of alternating current 12. The poles of the alternating current source are by-passed by the condenser 13 and the coil 10 of the transformer has an adjustable tap connection 14 so as to provide an adjustable current source.

The glass melt is maintained within the platinum casing 4 of the pot 6 and is melted by the heat of the electric current passing therethrough between the electrodes. The alternating current of the source 12 which passes through the melting charge as mentioned has a frequency of above 2,000 cycles per second. In this way melts will result which are faultless for technical purposes though in place of the platinum metal as the electrodes conventional graphite electrodes may be used. For even higher demands is is advisable to use metal electrodes instead of the conventional graphite electrodes since the former exhibit less burning off. Suitable metals, outside of molybdenum and tungsten, are mainly platinum metals of the platinum group. With a view to the high price of these metals it is practical to keep the surfaces of the electrodes small, i. e. to increase the transition current density between the electrodes and the melting charge. In order to sufficiently supress colloidal atomization of the electrodes in spite of the increased current density it is advisable to increase the frequency of the heater current to at least 4000 cycles per second.

For especially high demands e. g. as for optical glass, the heater current frequency is not at all allowed to fall below the above-mentioned limit of 4000 cycles per second because otherwise a slight scatter effect (Tyndall effect) will still remain which is visible in the dark field and which excludes such glasses from use for optical purposes. If metal electrodes, using higher current density are to be employed for the melting of optical glasses it is practical to increase the frequency of the heater current to at least 7000 cycles per second and to choose a current density of at least 10 amps. per square centimeter. In this manner optical glasses may be melted which are completely free from the Tyndall effect. In order to keep the costs for platinum electrodes to a minimum it is advisable to design them as thin metal layers 1 fitted to suitable insulated brackets 2, e. g. ceramic rods or tubular sockets. In the place of platinum or other metal electrodes also electrodes of liquid tin can be used, the best way being that at least the electrode being the lowest in the melting container consists of liquid tin.

It may be possible that under certain conditions the increased transient density will necessitate special attention that the temperature at the electrodes does not rise beyond the permissible margin. A simple way of doing this would be to bring about a relative motion between the electrodes and the melting charge, e. g. by bringing the electrodes opposite the stagnant melting charge into motion so that they continuously contact other parts of the melting charge. Another way would be to let the melting charge pass continuously by the electrodes by means of a stirring apparatus 3 driven by a conventional electric motor 15 set up near the electrodes. Finally, the electrodes can also be cooled by any of the known methods. When glasses are melted in a platinum pot 4 a single electrode may be sufficient since the pot can be used as a counterelectrode. In this case it is feasible to design the tubular electrode which dips into the melting charge in such a way that the joulean heat generated by the metallic conduct in the electrode can serve for the melting of the glass mixture.

We claim:

1. In the method for the melting of glass in an electrode furnace having electrodes in contact with a glass charge, by passing a heating current to the electrodes through the glass charge, the improvement which comprises applying an alternating heating current, having a frequency of at least 2,000 cycles per second across the electrodes.

2. Improvement according to claim 1, in which an alternating heating current having a frequency of at least 4,000 cycles per second is applied across the electrodes.

3. Improvement according to claim 1, in which an alternating heating current having a frequency of at least 7,000 cycles per second and a current density through the glass of at least 10 amps. per square centimeter is applied across the electrodes.

4. Improvement according to claim 1, which includes substantially continuously moving the glass charge and the electrodes in relation to each other.

5. Improvement according to claim 1, which includes cooling the electrodes.

6. In an electrode furnace for melting glass having electrodes positioned for passing a current therebetween through a glass charge in the furnace, the improvement which comprises means for applying an alternating current having a frequency of at least 2,000 cycles per second across the electrodes.

7. Improvement according to claim 6, in which said means are means for applying an alternating current having a frequency of at least 4,000 cycles per second across the electrodes.

8. Improvement according to claim 6, in which said means are means for applying an alternating current having a frequency of at least 7,000 cycles per second and a current density through the glass charge in the furnace of at least 10 amps. square centimeter across the electrodes.

9. Improvement according to claim 6, in which said electrodes are of a metal of the platinum group.

10. Improvement according to claim 6, in which at least one of said electrodes is in the form of a thin metal layer positioned about an insulating bracket.

11. Improvement according to claim 6, including means for causing relative motion between the glass charge in the furnace and the electrodes.

12. Improvement according to claim 11, in which said last-mentioned means are stirring means for stirring the glass charge.

References Cited in the file of this patent

UNITED STATES PATENTS

| Number | Name | Date |
|---|---|---|
| 880,743 | Von Kugelgen et al. | Mar. 3, 1908 |
| 1,555,258 | Allcutt | Sept. 29, 1925 |
| 1,555,259 | Allcutt | Sept. 29, 1925 |
| 1,572,873 | Allcutt | Feb. 16, 1926 |
| 1,594,496 | Clark | Aug. 3, 1926 |
| 1,601,703 | Patterson | Sept. 28, 1926 |
| 2,089,690 | Cornelius | Aug. 10, 1937 |
| 2,159,361 | Atkinson et al. | May 23, 1939 |
| 2,181,030 | Thomas | Nov. 21, 1939 |
| 2,635,388 | Peyches et al. | Apr. 21, 1953 |